United States Patent [19]

Schnaibel et al.

[11] 3,766,485

[45] Oct. 16, 1973

[54] FREQUENCY-VOLTAGE TRANSLATION CIRCUIT

[75] Inventors: Eberhard Schnaibel, Hemmingen; Helmut Fleischer; Edgar Schonart, both of Stuttgart; Karl-Heinz Adler, Leonberg, all of Germany

[73] Assignee: Robert Bosch GmbH, Gerlingen-Schillerhohe, Germany

[22] Filed: Mar. 13, 1972

[21] Appl. No.: 234,254

[30] Foreign Application Priority Data

Mar. 30, 1971 Germany.................. P 21 15 308.2

[52] U.S. Cl............ 332/16 R, 307/247 R, 329/110, 332/14

[51] Int. Cl.............................................. H03c 3/12

[58] Field of Search.................. 329/110; 332/1, 14, 332/16 T, 16; 307/247 R

[56] References Cited

UNITED STATES PATENTS

| | | | |
|---|---|---|---|
| 3,576,496 | 4/1971 | Garagnon | 307/247 R |
| 3,022,469 | 2/1962 | Bahrs et al. | 332/14 |
| 3,077,567 | 2/1963 | Gray | 332/14 X |
| 3,127,554 | 3/1964 | Kaneko | 332/14 X |
| 3,214,708 | 10/1965 | Chamberlain | 332/14 |

*Primary Examiner*—Alfred L. Brody
*Attorney*—Robert D. Flynn

[57] ABSTRACT

A pair of storage condensers having charging and discharge circuits, and a change-over circuit therebetween, are interconnected under control of a monostable multivibrator so that, when the monostable multivibrator is triggered into unstable state by input pulses, the trailing edge of the flanks of the pulses therefrom are connected to the charging circuit for one of the condensers to charge the condenser; and, connected to the discharge circuit to activate the discharge circuit and permit discharge of the condenser during the reset time of the monostable multivibrator and, additionally, to the change-over circuit to selectively block the change-over circuit. To provide good linearity, a function generator, preferably a diode-resistance network having an approximately parabolic or hyperbolic transfer function interconnects the storage condenser and the discharge circuit therefor. The monostable multivibrator is so connected that an output transistor thereof simultaneously forms part of the discharge circuit, to reduce the number of required components.

14 Claims, 4 Drawing Figures

FREQUENCY-VOLTAGE TRANSLATION CIRCUIT

Figure 1:
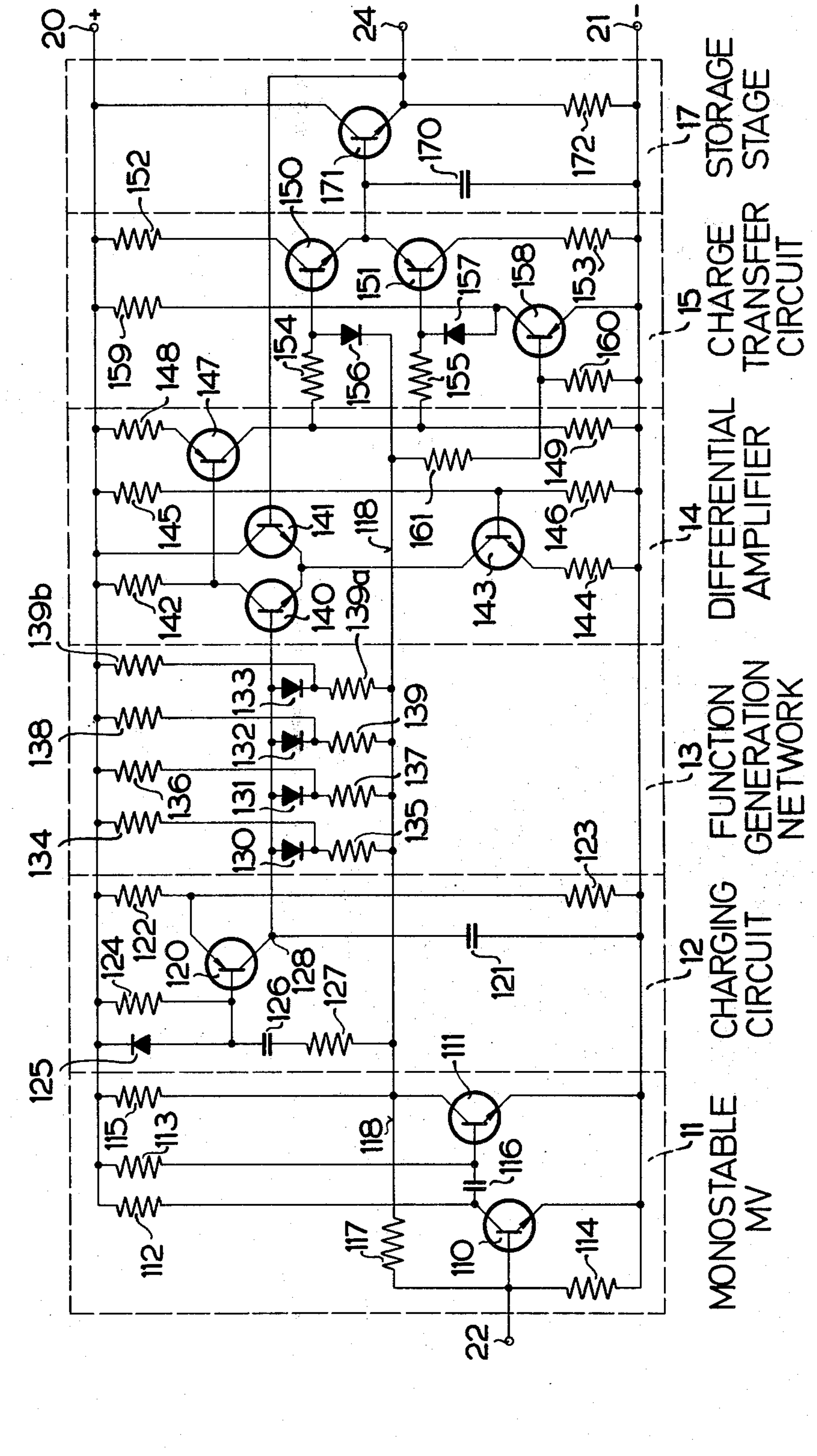

The present invention relates to a circuit providing a voltage output which is representative of an input frequency, and more when to such a circuit which can be connected to a tachometer generator which has a high are of sensitivity and provides a linear output of voltage with respect to frequency. to ground Frequency-voltage converters or translation circuits frequently utilize a storage condenser coupled to a charging switch and to a discharge circuit or switch for the storage condenser. Such frequency-voltage converters are customarily referred to as track-and-hold circuits. They are utilized frequently with tachometer generators or other devices in which speed is to be measured and in which the sensitivity of the circuit should be high. Such apparatus are required with tachometer generators or other speed-responsive apparatus utilized in wheel block or skid circuits, or in electronic gearing or transmissions. The tachometer generator usually provides a pulse source having square-wave output pulses of a frequency, or pulse repetition rate which is proportional to the speed to be measured. The mark-space ratio of the tachometer generator should be independent of frequency.

Previously proposed track-and-hold circuits may use more than one storage condenser; a first storage condenser is charged through a very low-resistance operating switch at each output pulse from the tachometer generator and then discharged over a relatively high-resistance discharge circuit. The discharge extends in time as the duration of the periods increases, that is, as the frequency decreases. When the next output pulse from the tachometer generator is applied to the storage condenser, the voltage $U_C$ on the storage condenser has been reduced to a value which becomes less, and less as the speed decreases. This storage value $U_C$ is then transferred over a charge change-over or transfer switch to a second storage condenser, from which it can be measured or utilized for further control or indicating functions. The response period, that is, the sensitivity of the tachometer generator with associated circuitry (in other words, the overall sensitivity) thus depends to some extent on the duration of the periods of the output pulses of the tachometer generator.

Known track-and-hold circuits of this type have the disadvantage that the first storage condenser is discharged in accordance with an exponential relationship so that the output voltage, that is, the output signal derived from the unit as a whole of the frequency-voltage translation device is not exactly proportional to the input frequency.

It is an object of the present invention to provide a frequency-voltage translation circuit which has low response time and high sensitivity, that is, which is compatible in sensitivity with known track-and-hold circuits and which, nevertheless, provides output signals which bear a linear relationship, preferably an exactly linear relationship with respect to input frequency.

Subject matter of the present invention: Briefly, the circuit includes a pair of storage condensers, a change-over circuit between the storage condensers, and a charging and discharge circuit for one of the storage condensers. The circuit is controlled by a monostable multivibrator which is triggered into unstable state in synchronism with the input frequency, preferably, over a frequency doubler. The trailing flank of the output pulse from the monostable multivibrator is sensed and used to control the charging circuit to charge the condenser; then to control connection of the discharge circuit for the charged condenser during the reset interval (stable state) of the monostable multivibrator and additionally to control the change-over circuit. A function generator is preferably interconnected between the first storage condenser and the discharge circuit, the function generator for example including a resistance-diode network which is so arranged that its transfer function is matched to the exponential decay of the discharge of the condenser, that is, has a parabolic or hyperbolic transfer function so that the output therefrom will bear a linear relationship to the charge on the condenser.

In a preferred form of the invention, as will appear hereafter, some of the circuit components can be utilized for multiple functions, thus reducing the requirements of electric component elements.

The invention will be described by way of example with reference to the accompanying drawings, wherein: rod 28. is FIG. 1 is a general schematic block diagram of the circuit in accordance with the present invention; 36.

Figure 2:
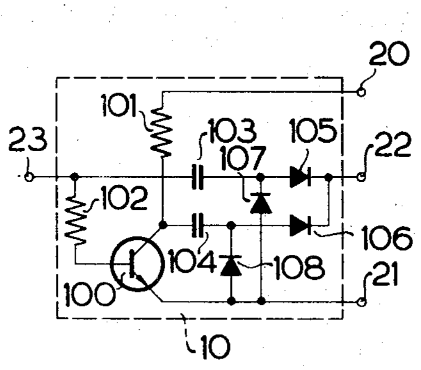
Figure 3:
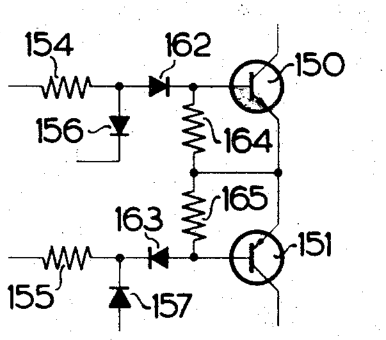
Figure 4:
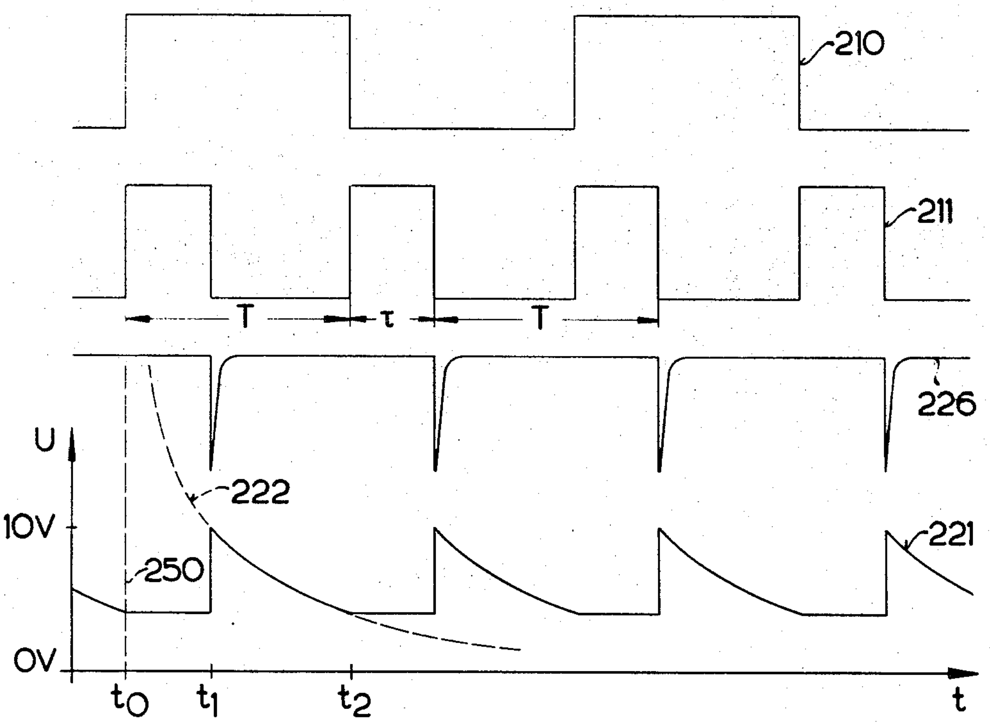

FIG. 2 is a detailed fragmentary circuit diagram of a frequency doubling stage for the circuit of FIG. 1;

FIG. 3 is a fragmentary circuit diagram of a protective circuit for the circuit of FIG. 1; and FIG. 4, in four superposed lines, is a timing diagram used in the explanation of the operation of the circuit. until the lowermost The circuit has the following general overall stages: A monostable multivibrator (MV) 11; a charging circuit 12 for a first condenser 121; a function generator 13; a differential so 14; a charge transfer circuit 15 to transfer charge to a second storage condenser 170, and a storage, or signal holding stage 17, which includes the second storage condenser 170. Input signal is provided, in pulse form, to an input terminal 22, and output is obtained across output terminals 21, 24. Terminal 20 is a positive supply bus, and terminal 21 is a common or chassis, or ground bus. FIG. 4

The monostable MV 11 utilizes a pair of npn transistors 110, 111 as their active elements. The emitters are directly connected to negative bus 21, and the collectors are connected over collector resistances 112, 113, respectively, with positive bus 20. The collector of the first transistor 110 is connected capacitatively over condenser 116 to the base of the second transistor 111. The collector of the second transistor 111 is connected galvanically over resistance 117 to the base of the first transistor 110. The base of the second transistor 111 is connected over resistance 115 to positive bus 20 and the base of the first transistor 110 is connected over resistance 114 to negative bus 21. The input terminal 22 is connected to the base of the first transistor 110. The charge-discharge circuit 12 includes a pnp transistor 120 having a collector connected to the first storage condenser 121 and its emitter to the tap point of a voltage divider formed of two resistances 122, 123 which, in turn, are connected across the positive and negative bus. The base of the transistor 120 is connected over the parallel connection of a diode 125 and resistance 124 to positive bus 20 over a series connected differential condenser 126 and resistance 127 to the output line 118 of the monostable multivibrator 11 which, in turn, is connected to the collector of transistor 111 therein.

The function generator 13 essentially includes four voltage dividers trailer; 135; 136, 137; 138, 139; 139*b*, 139*a*. These voltage dividers are connected between positive bus 20 lower position signalling and the output line 118 of the monostable MV 11. The collector from transistor 120, connected to the output line 128 of the charge circuit 12 is connected to each of a diode 130, 131, 132, 133 which connects at the other terminal thereof to the tap point of the voltage dividers 134, 135, etc.

The differential amplifier 14 has a pair of input transistors 140, 141, the emitters of which are connected together to the collector of a transistor 143 forming a constant current source. The emitter of transistor 143 is connected over resistance 144 to the negative bus 21. is in base of transistor 143 is connected to the tap point of a voltage divider formed of a pair of resistances 145, 146, connected between the positive and chassis buses 20, 21. The collector of transistor 140 activating connected over load resistance 142 to the positive bus 20; the collector of transistor 141 is connected directly to positive bus 20. The collector of the first input transistor 140 is additionally connected to the base of the output transistor 147, the emitter of which is connected over resistance 148 to positive bus 20 and the collector thereof over resistance 149 to negative bus 21.

The charge transfer circuit 15 is connected between positive bus 20 and negative bus 21 and includes a series connection formed of a resistance 152 and npn transistor 150, a pnp transistor 151 and lower position to its upper position. resistance 153. The base electrodes of the transistors 150, 151 are connected over resistances 154, 155 to the collector of an output transistor 147. Further, the base of transistor 150 is connected over a diode 156 to the output line 118 of the monostable MV 11. The base of transistor 151 is connected over a diode 157 with the collector of a transistor 158 in the charge transfer circuit. The charge transfer circuit transistor 158 has its collector additionally connected to the positive bus 20 over resistance 159. The base of transistor 158 is connected over resistance 160 to negative bus 21 and over resistance 161 to the output line 118 of the monostable MV 11.

The storage stage 17 includes the second storage condenser signalling the negative electrode of which is connected to the negative bus 21. The positive electrode is connected to the emitters of transistors 150, 151 as well as to the base of transistor 171. The emitter of transistor 171 is connected over an emitter resistance 172 to bus 21 and, further, directly to output terminal 24. It is additionally connected to the base of the second input transistor 141 of the differential amplifier 14.

The frequency doubler stage may be constructed in accordance with FIG. 2; it includes a pair of differentiating condensers 103, 104. The first one, condenser 103, is connected directly to input terminal 23; the second condenser 104 is connected over an inverting stage to the input terminal. The inverting stage includes a transistor 100 having a collector resistance 101 and a base resistance 102. The two differentiating condensers 103, 104 are connected over diodes 105, 106 to the output terminal of the frequency doubler which, at the same time, is the input terminal 22 of the frequency-voltage translation network. Diodes 107, 108 connect with the negative line 21.

The protective circuit of FIG. 3 is used to protect the charge transfer stage 15, and specifically to protect the transistors 150, 151 in the stage 15 against breakdown of the emitter-base diode functions. A diode 162 is connected between the base of transistor 150 and resistance 154; a diode 163 is connected between the base of transistor 151 and resistance 155. Additionally, resistances 164, 165 are connected between the bases of the transistors 150, 151 and the emitters thereof. In all other respects, the arrangement of the components is as shown in FIG. 1 and as described in connection therewith.

FIG. 4 illustrates, in superposed graphs, the following relationships: The input pulses to the frequency doubling stage 10 are shown on the top line 210; the output pulses of the monostable multivibrator are shown at 211, the input pulses of transistor 120 serving as a discharge switch are shown at 226 and the relationships of voltages on the first storage condenser 121 are shown at graphs 221. A common time scale completes the figure.

Operation: (Referring to FIGS. 1, 2 and 4): A tachometer generator of any known construction provides square wave output pulses 210 (FIG. 4) which are applied to input terminal 23 of the frequency doubler 10 (FIG. 2). The leading edge of the square wave pulse 210 is differentiated in first differentiating condenser 103 (FIG. 2); the trailing edge of the square wave pulse 210 is differentiated in the second differentiating condenser 104; each provides a positive sharp spiked pulse. These positive needle pulses are transmitted over diodes 105, 106 to input terminal 22 of the monostable MV 11. The corresponding negative needle pulses are short-circuited to the negative bus 21 by diodes 107, 108. Thus, for each square wave pulse 210, the monostable MV 11 is triggered twice so that at its output line 118, output pulses 211 will appear. These output pulses will have a pulse length $\tau$, and a pulse interval $T - \tau$. T is half the pulse duration of an input pulse 210.

The second transistor 111 in the monostable MV 11 is conductive, when in quiescent state. During the duration of an output pulse 211, second transistor 111 is blocked. It can thus be utilized in the circuit in accordance with FIG. 1 to have a multiple of functions: to control charge circuit or switch 120; to function as discharge circuit for the first storage condenser 121; and to block the transfer stage 15.

During the trailing edge of the output pulse 211 of the monostable MV 11, a negative needle pulse 226 is conducted over differentiating condenser 126 to the base of transistor 120. Transistor 120 thus becomes briefly conductive and charges the first storage condenser 121, for example to 10 V. This charge is very fast since the collector terminal 128 of transistor 120 is directly connected to the first storage condenser 121. The positive needle pulses applied from the output pulses 211 of the monostable MV 11 and derived from the differentiating condenser 126 are short-circuited to the positive bus 20 by means of diode 125.

During the pulse interval (the "space" time of the monostable MV), transistor 111 is conductive. Its collector terminal 118 is thus approximately at the voltage of the negative bus 21, and the storage condenser 121 can discharge during the pulse interval over the diode function network generator 13 and transistor 111. Initially, upon discharge, all the diodes 130–133 are conductive and the effective discharge resistance is relatively small. The voltage divider in function network 13 is dimensioned for various tap voltages. An example of suitable dimensions is given below. Diodes 130–133 sequentially become non-conductive during discharge of the condenser 121, thus gradually increasing the effective discharge resistance. By suitable dimensioning of the voltage divider within function generator network 13, the first storage condenser 121 is discharged not in accordance with an exponential function, but rather in accordance with a hyperbolic function, or any other desired function depending on the dimensioning of the network, in such a manner that the voltage $U_C$ across the condenser 121 is linear with respect to discharge time. Exact linearity can be obtained by selecting a suitable number of properly adjusted voltage dividers.

During the discharge period of the first storage condenser 121, all three transistors 158, 150, 151 of the charge transfer circuit 15 are blocked, since the base electrodes of the two transistors 150, 158 are at negative voltage. During the discharge period of the first storage condenser 121, the second storage condenser 170 retains its voltage. As soon as the second monostable MV 11 provides its next output pulse, transistor 111 will block so that its collector terminal 118 is close to the voltage of the positive bus 20. Transistor 158 in the charge transfer stage 15 then becomes conductive and the two diodes 156, 157 are placed in blocking condition. Transistors 150, 151 can be controlled into conductive condition depending on the output voltage of the differential amplifier 14 which in turn depends on the collector voltage of transistor 147.

During the pulse duration $\tau$ of the monostable MV 11, discharge of the first storage condenser 121 is interrupted. The differential amplifier 14 compares the voltage on the two storage condensers 121 and 170. If, for example, the voltage on the first storage condenser 121 is higher than that on the second storage condenser 170, the first input transistor 140 of differential amplifier 141 accepts the entire current of the constant current source 143. This causes resistance 142 to have a voltage appear thereacross which controls output transistor 147 to be conductive. Current of the output transistor 147 flows through the collector resistance 149. The voltage drop on resistance 149 controls pnp transistor 151 into blocked condition, and controls npn transistor into conductive condition. Thus, storage condenser 170 is further charged over the second npn transistor 150.

If, conversely, during the pulse, the voltage on the first storage condenser 121 in the monostable MV stage is reduced and becomes less than that on the second storage condenser 170, the second input transistor 140 in the differential amplifier will conduct the current from the constant current source 143, so that the collector resistance 142 will not have voltage drop appear thereacross, and output transistor 147 remains conductive. The collector of output transistor 147 is thus close to the voltage of the negative bus 21. The npn transistor 150 is then blocked and the pnp transistor 151 becomes conductive, and the second storage condenser 170 can discharge over the pnp transistor 151 to the negative bus 21.

The charge and discharge cycles, respectively, of the second storage condenser 170 continue until the voltages at the two storage condensers 121, 170 are alike, that is, if the two inputs to the differential amplifier 14 are at the same, or approximately at the same voltage. The difference between the two voltages on the storage condensers, after the charge transfer has taken place, is limited to the value of the offset, or tolerance voltage of the differential amplifier 14. This tolerance is in the order of a few milliVolts and does not interfere with proper operation and can be neglected.

The second storage condenser 170 has emitter follower 171, 172 connected thereto, so that the storage condenser 170 is not loaded by the input current of the differential amplifier 14 and further not loaded by the input current of the following utilization circuit. The charge transfer stage 15 should utilize transistors 150, 151 which have breakdown voltages of the base-emitter junctions which are as high as possible. During the time the transistor 111 in monostable MV 11 is conductive, the entire supply voltage could be applied, in blocking direction, to the base-emitter diode sections of the transistors 150, 151, depending on the speed to be measured.

If transistors are to be used, or are available, which have only a small or low base-emitter blocking voltage, then the protective circuit of FIG. 3 can be utilized. Additional diodes 162, 163 are interconnected in advance of the base of the transistors 150, 151, poled in the same direction as the base-emitter diode section of the associated transistor, so that the blocking voltage of the diodes adds to the blocking voltage of the base-emitter section of the transistors. The diodes 162, 163 are poled opposite to the diodes 156, 157 so that reliable blocking of transistors 150, 151 additionally requires resistances 164, 165 between base and emitter.

The voltage on the first storage condenser 121 should be exactly linear at the time period $t_2$ in dependence on the frequency of the tachometer generator. During the period T, linear relationship should likewise be obtained, but with negative sign. The discharge curve 222 of the first storage condenser 121 thus must be a portion of a rectangular hyperbola, the two asymptotes of which are given by the time axis t and the vertical indicated in FIG. 4 at line 250. This can be obtained by suitable choice of impulse time $\tau$ of the monostable MV 11 and proper dimensioning of the function network 13.

The following relationship is required:

During time interval between $t_0$ and $t_2$:

$$U_c = K_1 + K_2 \cdot f = K_1 + K_2 \cdot 1/t \tag{1}$$

$K_1$ and $K_2$: constants;

$f$: frequency.

$$i_c = C \cdot (dU_c/dt) \tag{2}$$

$i_c$: discharge current;

$C$: capacity in F;

$U_c$: charge voltage.

Substituting (1) in (2):

$$i_c = C \cdot (-K_2/t^2) \tag{3}$$

Substituting (1) in (3) to eliminate t:

$$i_c = (-C/K_2)\ (U_c - K_1)^2 \quad (4)$$

Resistance Values for Function Network 13:

| | |
|---|---|
| 134:405 kΩ | 135:33 kΩ |
| 136:92 kΩ | 137:24.5 kΩ |
| 138:33.6 kΩ | 139:24.3 kΩ |
| 139*b*:17.1 kΩ | 139*a*:31.6 kΩ |

As indicated in the formula (4), discharge current $i_c$ is dependent in accordance with the parabolic function from the condenser voltage, if the condenser voltage $U_c$ at time $t_2$ should have a value which is linearly proportional to the frequency of the input pulses, that is, to the speed of a tachometer generator.

The foregoing table of values, which are to be considered as an example only, operate under measurement frequency of up to about 5.5 kHz. The parabola in accordance with formula (4) is approximated in the function network 13 by four straight line segments, as well known in analog computation technology. The pulse duration $\tau$ of the monostable MV stage 11, in the above example, is 155 micro seconds, so that the initial point of the discharge curve 222 exactly falls to the proper right angle hyperbola.

The frequency-voltage translation network thus provides a linear relationship between input frequency and output voltage with high sensitivity, and with high accuracy, the accuracy depending to some extent on the number of resistance-diode networks in the function generator network to approximate the curve. The response period is limited by the frequency doubling stage 10 to half of a pulse period $T$ of the input frequency. The circuit has the additional advantage that the differential amplifier 14 compares the desired value, or command value of the output voltage with a sensed or actual value, to thereby provide for true control of the voltage on the second condenser 170, rather than merely applying a voltage to the second storage condenser.

The circuit in accordance with the present invention may be changed in various respects. As an example, transistor 158 in the charge transfer circuit 15 is not strictly necessary. The base of transistor 151 can be connected to the collector of transistor 110 in the monostable MV 11. In the example given, transistor 111 itself has a multiple of functions; it is not necessary to utilize transistor 111, however, in the discharge circuit but, rather, a separate discharge switch or circuit can be utilized which is then also preferably controlled directly by transistor 110. The parabolic function in the function generator network 13 can be improved by utilizing a greater number of voltage dividers and associated diodes, as shown; likewise, for lesser accuracy, material can be saved by utilizing a smaller number.

Various other changes and modifications may be made within the inventive concept.

We claim:

1. Frequency-voltage translation circuit having pulse input (23) and a variable voltage output (24, 21) comprising two storage condensers (121, 170);

a change-over circuit (15) interconnecting the storage condensers;

charging (12) and discharging (111) circuit means for one of the storage condensers (121);

a monostable multivibrator (11) controlling interconnection of the change-over circuit (15), the charging circuit (12) means and the discharge circuit means (111) with a first one of the condensers (121);

means (10; 22) connecting the input pulses to the monostable multivibrator (11) to trigger the multivibrator into unstable state;

means (126) sensing a flank edge of the pulses of the monostable multivibrator (11) and connected to the charging circuit (12) of said one condenser (121) to effect and control charging of said first condenser (121), further connected to the discharge circuit (111) of said first condenser (121) to actuate and control discharge of said first condenser (121) during a pulse interval of the monostable multivibrator (11), and further connected to said change-over circuit (15) to block said change-over circuit during the discharge time of the condenser; and means (17) connecting the other (170) of said storage condensers to the variable voltage output (24, 21) said other condenser (170) having a charge applied thereon in the time interval when the change-over circuit is not blocked, which charge corresponds to the remanent charge on said first condenser (121).

2. Circuit according to claim 1, wherein the trailing edge (211) of the pulses from the monostable multivibrator are sensed and connected to the charging circuit to effect charging of the first condenser (121) and to the discharge circuit (111) to activate the discharge circuit during the reset time of the monostable multivibrator and to block the change-over circuit during the discharge time.

3. Circuit according to claim 1, further comprising a function generator network (13) interconnected in the discharge circuit (111) of the first storage condenser (121).

4. Circuit according to claim 3, wherein the function generator network (13) comprises a resistance-diode network (130–139).

5. Circuit according to claim 4, wherein the resistance-diode network is dimensioned to provide a relationship between voltage, defined as $U_c$, on the first storage condenser and discharge current, defined as $i_c$, therefrom approximately parabolically and substantially in accordance with the relationship $i_c = (C/K_2)\ (U_c - K_1)^2$ wherein $C$ is the capacity of the first storage condenser in $F$ and $K_1$ and $K_2$ are constants.

6. Circuit according to claim 1, wherein the monostable multivibrator comprises an output transistor (111), said output transistor being connectable in circuit with the first storage condenser (121) to form at least part of the discharge circuit therefor.

7. Circuit according to claim 1, wherein the change-over circuit comprises a pair of transistors (150, 151) of opposite conductivity type, the voltage ($U_C$) from the first storage condenser (121) being applied to said transistors during the unstable pulse duration of the monostable multivibrator (11);

one of said transistors (150) being connectable to charge the second storage condenser (170) and the second transistor (151) being connectable to discharge the second storage condenser (170).

8. Circuit according to claim 1, including a differential amplifier circuit (14) interconnected between the first storage condenser (121) and the change-over circuit (15), the differential amplifier including an input transistor (140) having the voltage of the first storage condenser (121) applied thereto; and further including a second input transistor (141) having the voltage on the other storage condenser (170) applied thereto.

9. Circuit according to claim 1, further including a frequency doubler stage (10) connected in advance of the monostable multivibrator (11) so that the monostable multivibrator will change to its unstable state at twice the pulse rate as the input frequency.

10. Circuit according to claim 9, wherein the frequency doubler stage (10) includes a first differentiating condenser (103) interconnected between the input and output of the frequency doubler stage;

and a parallel circuit comprising the series connection of an inverter stage (101) and a second differentiating condenser (104).

11. Frequency-voltage translation circuit having an input connected thereto on which pulse signals appear and an output on which variable voltage signals appear, said circuit comprising a storage condenser (121);

a charging circuit (12) for said storage condenser and a discharge circuit (111) for said storage condenser;

a multivibrator (11) controlling interconnection of the charge and discharge circuit to said storage condenser, said multivibrator being triggered to change state by said input pulses;

means (126, 125) sensing pulse flanks from said multivibrator and controlling the charging circuit of said one condenser to effect charging thereof upon sensing a pulse flank;

and means (111) controlled by a sensed pulse flank of said multivibrator and controlling connection of the discharge circuit to said condenser, said discharge circuit including a function generation network (13) having an inversely exponential transfer function to provide for a relationship of discharge time with respect to charge on the condenser which is essentially linear.

12. Circuit according to claim 11, wherein said multivibrator (11) is monostable and said means (126, 125) sensing a flank of the pulse from the monostable multivibrator senses the trailing flank of the pulse from the monostable multivibrator upon return to its stable state after having been triggered by an input pulse.

13. Circuit according to claim 11 further comprising a second condenser (170) and a charge transfer circuit (15) controlled by said multivibrator (11) and effecting interconnection of said second condenser (170) and said first condenser (121) after the first condenser has discharged for a time interval as controlled by a pulse flank;

and means (17) connected to said second condenser (170) and deriving the output variable voltage as a representation of the charge on said second condenser.

14. Circuit according to claim 13 wherein said charge transfer circuit (15) includes a comparator circuit (14) comparing the remanent charge, after discharge, on said first condenser (121) and the charge previously appearing at said second condenser (170) and controlling, selectively, recharging, or discharge of said second condenser (170) to establish equality between the charge on said second condenser (170) and the remanent charge on the first condenser (121).

* * * * *